July 29, 1969    J. D. PRIDE, JR., ET AL    3,458,217
TUBULAR COUPLING HAVING LOW PROFILE BAND SEGMENTS WITH MEANS
FOR PREVENTING RELATIVE ROTATION
Filed Nov. 25, 1966

INVENTORS
JOSEPH D. PRIDE, JR.
JAMES W. MAYO

BY

ATTORNEYS

United States Patent Office 3,458,217
Patented July 29, 1969

3,458,217
TUBULAR COUPLING HAVING LOW PROFILE BAND SEGMENTS WITH MEANS FOR PREVENTING RELATIVE ROTATION
Joseph D. Pride, Jr., 22 Terrace Drive, Poquoson, Va. 23362, and James W. Mayo, 37 Executive Drive, Newport News, Va. 23606
Filed Nov. 25, 1966, Ser. No. 597,141
Int. Cl. F16c 35/00, 37/00
U.S. Cl. 285—3                                    5 Claims

ABSTRACT OF THE DISCLOSURE

The instant invention contemplates a low profile clamping band for connection of adjacent stages of an aerospace vehicle and which comprises a plurality of semicircular segments secured by clamping bolts pulling on the centroid of the band to achieve high hoop tensile capacity and minimal secondary circumferential bending stresses. The band segments are recessed into machined grooves on the outer surfaces of the adjacent stages to provide an overall low profile configuration of the vehicle as well as keying effect to prevent relative rotation of the band and stages.

---

The invention described herein was made by employees of the United States Government and may be manufactured and used by or for the Government for governmental purposes without the payment of any royalties thereon or therefor.

Various types of clamping bands have been used for several years as a device for connecting the stages of aerospace vehicles while in flight. The early type Marman bands were rolled or formed from steel sheet stock into semi-circular pieces that sometimes resembled a clamp used to attach the top of a barrel. Such types of bands are well suited to fairly large diameters where the loads across the joint are not high. Another clamping band concept uses a flat steel band wrapped around a number of shoes or local segments which provide the holding action across the joint in question. This design is fairly well suited for high static loads or fairly small to very large diameters and will separate by using one or more bolts.

The previously known clamping bands have failed to provide tight joints by their inherent lack of cross sectional area and poor fitting qualities that often result in very low load carrying capabilities. The previous bands were assembled by procedures based largely on tightening the band and hitting the band itself with hammers or other hard objects in an attempt to distribute the hoop tensile effect, but never being able to determine the final location of the band with respect to the joint clamping surfaces. In addition, past bands have protruded from the flight vehicle, particularly in the areas of the connecting bolts, resulting in high aerodynamic drag, heating and buffeting effects. This localized projection has been necessary to accommodate the clamping bolts. Since the bolts are displaced outwardly of the centroid of the cross section of the band, secondary localized bending stresses have been added in the band itself and thus have reduced the hoop tensile clamping efficiency of the band.

In view of the above statements, it is an object of the instant invention to provide a high load carrying capacity and a structurally sound quick release joint that minimizes aerodynamic buffeting and drag effects on flight vehicles.

Another object of this invention is to provide a low profile band connector permitting uniform separation of stages while incorporating precision fit and location.

A further object of this invention is to provide a quick release stage connector utilizing precision keying to prevent torsional rotation and providing interstage alignment.

A still further object of the instant invention is to provide a quick release stage connector clamping band having a plurality of semi-circular segments secured by clamping bolts which are aligned with the centroid of the clamping band to achieve high hoop tensile capacity and minimal secondary circumferential bending stresses.

Generally, the foregoing and other objects are accomplished by utilizing a clamping band that overlies precision machined surfaces or recesses in the adjacent portion of the stages being connected. The clamping band is comprised of a plurality of semi-circular segments that are secured by bolts aligned with the centroid of the clamping band.

A more complete appreciation of the invention and many of the attendant advantages thereof will be readily apparent as the same becomes better understood by reference to the following description when considered in connection with the accompanying drawings wherein.

Figure 3:
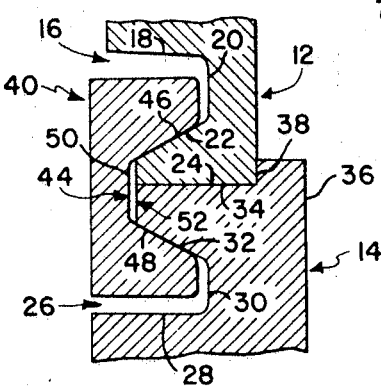
FIG. 3 is a cross sectional view taken on line 3—3 of FIG. 2 with portions omitted for clarity.

Referring now to the drawings and, more particularly, to FIG. 3 wherein band connector 10 is shown securing adjacent stages 12 and 14. Upper stage 12 has recess 16 that includes side 18, bottom 20 and accurately machined angular surface 22. Upper stage 12 has machined face 24 on the lower edge thereof for a purpose to be more fully described hereinafter. Lower stage 14 also has a recess 26 having side 28, bottom 30 and machined surface 32 for a purpose to be described more fully hereinafter. The upper edge of lower stage 14 has machined face 34 extending inwardly from the outer face of stage 14 to a tongue or projection 36 having a machined outer face 38. The machined faces 24, on upper stage 12, and 34 and 38 on lower stage 14 mate as shown in FIG. 3 to provide a closely fitting joint between upper stage 12 and lower stage 14. The arrangement as just described provides for a transferral of load from lower stage 14 to upper stage 12 during launch and propulsion of the aerospace vehicle.

Figure 1:
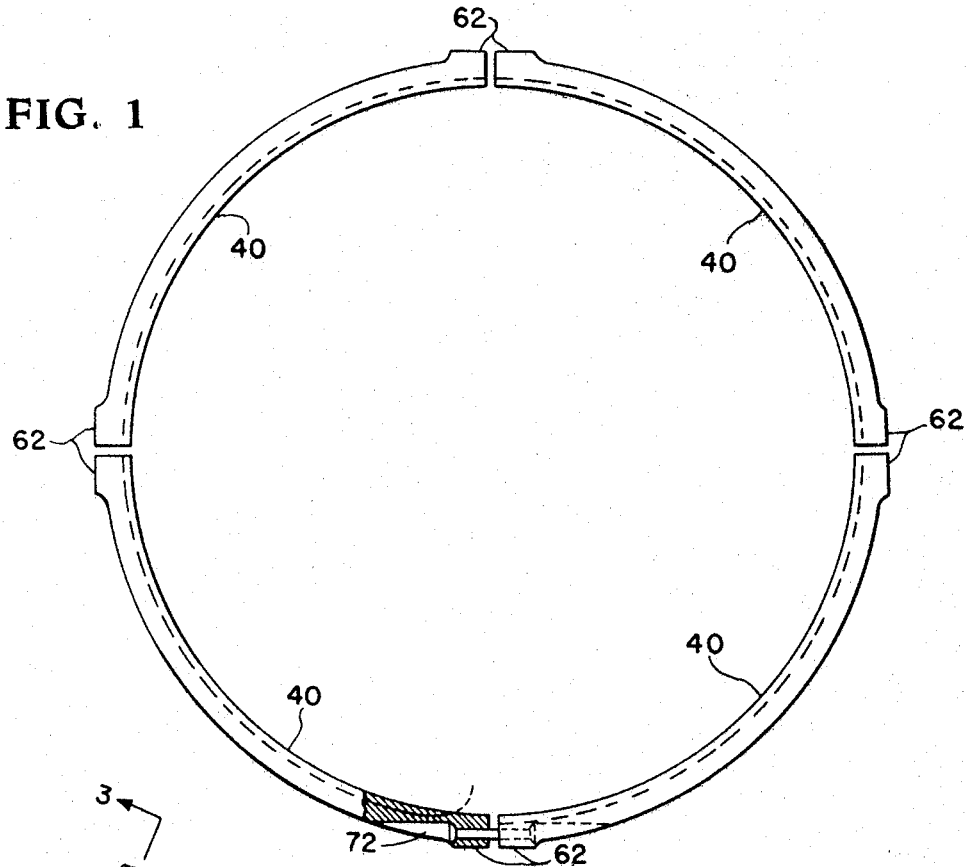
FIG. 1 is a diagrammatic top view of the instant invention.
Figure 2:
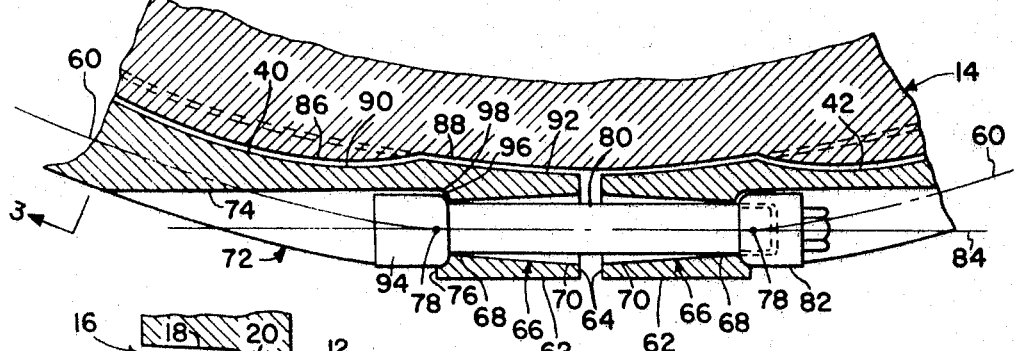
FIG. 2 is a top sectional view of a portion of the band of FIG. 1.

Band connector 10 has a plurality of semi-circular band sections or segments 40 that are of substantially rectangular cross section. Although only two band segments 40 are shown in FIG. 2, it is to be understood that any number of segments 40 can be utilized as desired. For example, four sections 40 could be assembled as shown in FIG. 1. As best seen in FIG. 3, band segment 40, which is typical of all segments, has an inner recess 44 on the longitudinally concave rear surface thereof. Recess 44 has angular machined surfaces 46 and 48 and bottom 50 connecting the two angular surfaces. Surfaces 46 and 48 and bottom 50 are machined and so dimensioned that they matingly engage, with minimal tolerances, surfaces 22 and 32 on stages 12 and 14, respectively. That is, when stages 12 and 14 are in the assembled position, the portion between surfaces 22 and 32 forms tongue 52 which matingly engages inner recess 44 of band segment 40. This type of arrangement provides a low profile and an accurately located connector as is readily apparent from FIG. 3.

Band segment 40 has centroid line 60 for a purpose to be described more fully hereinafter. Each end of band segment 40 has outward projection 62 extending outwardly therefrom with a common end surface 64. Bore 66 extends substantially tangentially to centroid line 60 through projection 62 and is machined to have a narrower portion 68 and broader portion 70 adjacent end 64. Adjacent projection 62 is depression 72 having outwardly directed face 74 and projection end or side wall 76. Bore 66 is machined or drilled through projection 62 such that when a plurality of band segments 40 are joined about upper stage 12 and lower stage 14 center line 84 of bolt 80 intersects centroid line 60 on an imaginary projection of face 74 which is point 78 shown in FIG. 2. Side wall 76 is rabbeted on a spherical radium about bore 66 to provide seat 98 for spherical portion 96 on bolt head 94 and nut 82.

As best seen in FIGS. 2 and 3, tongue 52 on stages 12 and 14 has longitudinally arcuate face 86 that phases tongue 52 into the bottoms 20 and 30 of recesses 16 and 26. Thus, in the region between ends 76 the bottoms 20 and 30 connect to form a smooth surface 88. Recess 44 in band segment 40 gradually gets more shallow along arcuate face 90 that terminates on the inner surface 92 of segment 40. Such an arrangement provides a keying of sections 40 to prevent torsional rotation and insure alignment of stages 12 and 14.

A conventional pyrotechnic or explosive bolt 80 connects segments 40 of band 10. Nut 82 and bolt head 94 are utilized for securing adjacent projections 62 together in a manner providing self-alignment because of the interfitting spherical radii of portions 96 and seats 98.

In operation the band is located segmentally about upper stage 12 and lower stage 14 and bolts 80 are utilized for connecting adjacent band segments 40. Utilization of strain gages mounted on each band segment facilitates the assembly procedure by showing the exact hoop tensile stress in the band after assembly thereby permitting disassembly and accurate reassembly. After stages 12 and 14 have been properly connected by band 10 and the vehicle has been launched, it is merely necessary to detonate bolt 80 by conventional means, not shown, associated therewith to cause segments 40 to separate and permit stages 12 and 14 to be disconnected.

The low profile clamping band consists of any number of machined segments interconnected by explosive release bolts to provide a clamping force exerted by the hoop tension induced in the band. When in position the clamp band is largely recessed away from the high velocity air stream. Strain gages mounted on each band segment facilitate the assembly procedure by showing the exact tensile stress in the band after assembly on the flight vehicle. A high operational redundancy is insured since any one of the explosive bolts will allow the band to completely separate.

Although the clamping band system described hereinabove could be utilized for any circumferential mating joints requiring high load capacity, low profile and approved assembly features, it is not intended that this invention be limited to the use of fasteners as a clamping means since it provides the advantages of high load carrying capacity and therefore more efficient use of material, tightness across the joint, a low profile resulting in low drag and low aerodynamic and buffeting effects, precision fitting at assembly, centroid line of action resulting in a band with high hoop tensile capacity and essentially zero secondary bending stresses in the circumferential direction, ease of assembly, prevention of relative rotation of assembled parts, and a homogeneous rigid structure requiring the minimum number of parts and having a high redundancy. The low profile of the band is accomplished by recessing into the vehicle structure in order to minimize aerodynamic drag and harmful heating effects. The precision machined band results in a predetermined location of the band with respect to the clamping surfaces due to the keying effect at the points of connection of the band sections. The centroidal line of action whereby the band when assembled has a high efficiency in clamping effect is a further advantage of the instant invention.

Obviously many modifications and variations of the subject invention are possible in the light of the above teachings.

What is claimed as new and desired to be secured by Letters Patent of the United States is:

1. A clamping band connection between a pair of primary tubular members comprising a plurality of arcuate band segments of substantially rectangular cross section and having a groove on the inner surface thereof; adjacent portions of said primary tubular members having mating surfaces and recessed grooves having angular surfaces forming a tongue and matingly engaging said grooves in said band segments, and wherein said tongue forming portions of said primary members have sections gradually diminishing to the bottoms of said recessed grooves, and the inner surface of said groove of said band segments getting gradually shallower at each end in corresponding relationship to said tongue to provide a keying effect preventing torsional rotation between said primary tubular members; and connection means for releasably connecting adjacent ends of said band segments.

2. The clamping band connection of claim 1 wherein said connection means includes depressions formed in said band segments at each end to form projections therein, and further including means acting on said projections to connect said segment ends.

3. The clamping band connection of claim 2 wherein said connection means also includes a bore extending through each projection substantially aligned with the centroid of said band segment.

4. The clamping band connection of claim 3 wherein said connection means also includes pyrotechnic nut and bolt assemblies extending through said bores and wherein said bores have a diameter adjacent the depression side of said projection less than the diameter adjacent the end of said segments in order to alleviate the formation of stress and to provide self-alignment of said portions.

5. The clamping band connection of claim 4 wherein said nut and bolt assembly includes spherical portions on the bolt head and nut; and a spherical seat formed in said projections about said bores, to assist in self alignment.

References Cited

UNITED STATES PATENTS

| | | | |
|---|---|---|---|
| 2,543,673 | 2/1951 | Searle | 285—411 X |
| 2,697,570 | 12/1954 | Snyder | 285—367 X |
| 2,809,584 | 10/1957 | Smith | 285—2 X |
| 2,996,316 | 8/1961 | Terhune | 285—4 X |
| 3,122,098 | 2/1964 | Glennan | 102—49.5 |
| 3,124,071 | 3/1964 | Mobley et al. | 102—49.5 |

FOREIGN PATENTS 382,169  10/1932  Great Britain.

THOMAS F. CALLAGHAN, Primary Examiner

U.S. Cl. X.R.

24—279; 85—1; 102—49.5; 285—410